Patented Sept. 16, 1952

2,610,969

UNITED STATES PATENT OFFICE 2,610,969

PRODUCTION OF DIARYL PYRAZOLINES

John David Kendall and George Frank Duffin, Ilford, England, assignors to Ilford Limited, Ilford, England, a British company No Drawing. Application May 29, 1950, Serial No. 165,117. In Great Britain June 3, 1949

3 Claims. (Cl. 260—310)

This invention relates to the production of diaryl pyrazolines.

If a 1-aryl pyrazoline is coupled in acid solution with a diazonium salt of an aromatic amine, an azo dye is obtained and this is believed to be a 3-arylazo-1-arylpyrazoline. It has now been discovered, however, that if the reaction is carried out in a basic medium the main product formed is a 1:3-diaryl pyrazoline.

According to the present invention, therefore, a process for the production of 1:3-diaryl pyrazolines comprises reacting in a basic medium a 1-aryl pyrazoline with a diazonium salt prepared from a primary arylamine. Conveniently the reaction may be effected in aqueous pyridine or alcoholic alkali.

The reaction is somewhat surprising since azo dye formation usually occurs when azo dye components are coupled in alkaline media.

The process of the present invention is believed to follow the equation:

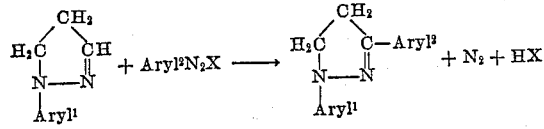

The acid HX is absorbed by the basic medium and the nitrogen can be observed to bubble away from the reaction mixture. In the foregoing formulae the aryl groups may be, for example, phenyl or naphthyl groups, or aryl groups carrying alkyl, aralkyl, aryl, nitro, alkoxy, hydroxy, hydroxyalkyl, carboxylic or sulphonic groups, or halogen atoms. The aryl group in the 1-position can also be substituted by amino or substituted amino groups.

The following examples will serve to illustrate the invention:

EXAMPLE 1

*Preparation of 1:3-diphenyl pyrazoline*

0.93 part by weight of aniline was dissolved in 2.5 parts by volume of concentrated hydrochloric acid and 2.5 parts of water, cooled to 5° C. and diazotised by the addition of an aqueous solution of 0.7 part by weight of sodium nitrite. The solution was added to a stirred solution of 1.45 parts by weight of 1-phenyl pyrazoline in 10 parts by volume of pyridine while maintaining the temperature between 0° and 5° C. After standing for one hour the mixture was diluted with 100 parts of water and the product removed by filtration. It was purified by recrystallisation from ethyl alcohol to give very pale yellow needles. M. pt. 152° C.

EXAMPLE 2

*Preparation of 1:3-di-(m-tolyl) pyrazoline*

1.09 parts by volume of m-toluidine were dissolved in 2.5 parts by volume of concentrated hydrochloric acid and 2.5 parts of water, cooled to 5° C. and diazotised by the addition of an aqueous solution of 0.7 part by weight of sodium nitrite. The solution was added to a stirred solution of 1.6 parts by weight of 1-m-tolyl pyrazoline in 10 parts by volume of pyridine. After standing for one hour the mixture was diluted with 100 parts of water and the solid removed by filtration. The product was purified by recrystallisation from methyl alcohol to give yellow plates. M. pt. 120° C.

EXAMPLE 3

*Preparation of 3-phenyl 1-(m-tolyl) pyrazoline*

1.18 parts by volume of aniline were dssolved in 3 parts by volume of concentrated hydrochloric acid and 3 parts of water, cooled to 5° C., and diazotised by the addition of an aqueous solution of 0.93 part by weight of sodium nitrite. This solution was added to a stirred solution of 2.00 parts by weight of 1-m-tolyl pyrazoline in 14 parts by volume of pyridine while maintaining the temperature between 0° and 5° C. After standing for one hour the mixture was diluted with 100 parts of water when a reddish oil was precipitated. The oil solidified on treatment with methyl alcohol and the solid was recrystallised from methyl alcohol to give yellow crystals. M. pt. 88.5° C.

EXAMPLE 4

*Preparation of 1-phenyl 3-(m-tolyl) pyrazoline*

1.09 parts by volume of m-toluidine were dissolved in 2.5 parts by volume of concentrated hydrochloric acid and 2.5 parts of water, cooled to 5° C. and diazotised by the addition of an aqueous solution of 0.7 part by weight of sodium nitrite. The solution was added to a stirred solution of 1.48 parts by weight of 1-phenyl pyrazoline in 10 parts by volume of pyridine. After standing for one hour the mixture was diluted with 100 parts of water and the solid removed by filtration. The product was purified by recrystallisation from methyl alcohol to give yellow crystals. M. pt. 77° C.

EXAMPLE 5

*Preparation of 1-phenyl 3-(p-bromophenyl)-pyrazoline*

3.42 parts by weight of p-bromoaniline were dissolved in 5 parts by volume of concentrated hydrochloric acid and 10 parts of water, cooled to 5° C. and diazotised by the addition of an aqueous solution of 1.4 parts by weight of sodium nitrite. The solution was added to a stirred solution of 2.9 parts by weight of 1-phenyl pyrazoline in 20 parts by volume of pyridine while maintaining the temperature between 0° and 5° C. After standing for one hour the mixture was diluted with 200 parts of water and the solid removed by filtration. The product was purified by recrystallisation from methyl alcohol to give small light yellow plates. M. pt. 130° C.

EXAMPLE 6

*Preparation of 1-phenyl 3-(p-sulphophenyl)pyrazoline*

1.73 parts by weight of sulphanilic acid were dissolved in 2.5 parts by volume of concentrated hydrochloric acid and 5 parts of water, cooled to 5° C. and diazotised by the addition of an aqueous solution of 0.7 part by weight of sodium nitrite. This solution was added with stirring to a solution of 1.46 parts of 1-phenyl pyrazoline in 10 parts by volume of pyridine while maintaining the temperature between 0° and 5° C. After standing one hour the mixture was diluted with 50 parts of water, strongly acidified with 20 parts by volume of concentrated hydrochloric acid. Strong salt solution was then added when a yellow solid was precipitated. The mixture was cooled in ice, filtered and the solid washed with water. The product was finally purified by recrystallisation from water containing some animal charcoal to give small buff-coloured plates. M. pt. 300° C.

The 1:3-diaryl pyrazolines produced by the process of this invention are in many cases entirely new compounds, and such new compounds per se form part of this invention. In general the compounds exhibit a strong violet or blue fluorescence in daylight or ultra-violet light and a lesser fluorescence in ordinary electric light, and are of use where compounds having such properties are of value, e. g. as textile whitening agents as described in co-pending application Serial No. 165,116 filed on even date herewith.

What we claim is:

1. Process for the production of 1:3-diaryl pyrazolines which comprises reacting in a basic medium a 1-aryl pyrazoline wherein the 3-position is unsubstituted, with a diazonium salt of a primary arylamine.

2. Process for the production of 1:3-diaryl pyrazolines which comprises reacting in aqueous pyridine a 1-aryl pyrazoline wherein the 3-position is unsubstituted, with a diazonium salt of a primary arylamine.

3. Process for the production of 1:3-diaryl pyrazolines which comprises reacting in the presence of alcoholic alkali a 1-aryl pyrazoline wherein the 3-position is unsubstituted, with a diazonium salt of a primary arylamine.

JOHN DAVID KENDALL.
GEORGE FRANK DUFFIN.

REFERENCES CITED

The following references are of record in the file of this patent:

Chem. Abst., vol. 32, p. 1667³ (1938), citing Jacob et al., Jr. Chem. Society (London) 1937, pp. 1929–1931.

Chem. Abst., vol. 41, p. 1221, citing Panizzi-Gazz. Chim. ital 73, pp. 335–343 (1943).

Beilstein, Vierte Auflauge, Handbuch der Organischen Chemie, vol. 23, pp. 153 and 168.